(12) United States Patent
Schern et al.

(10) Patent No.: US 10,955,870 B2
(45) Date of Patent: Mar. 23, 2021

(54) BACKHOE PEDAL GUARDS

(71) Applicants: Mike Schern, Mesa, AZ (US); Justin Naylor, Mesa, AZ (US); Phil Woody, Mesa, AZ (US)

(72) Inventors: Mike Schern, Mesa, AZ (US); Justin Naylor, Mesa, AZ (US); Phil Woody, Mesa, AZ (US)

( * ) Notice: Subject to any disclaimer, the term of this patent is extended or adjusted under 35 U.S.C. 154(b) by 0 days.

(21) Appl. No.: 16/862,995

(22) Filed: Apr. 30, 2020

(65) Prior Publication Data

US 2020/0348712 A1    Nov. 5, 2020

Related U.S. Application Data

(60) Provisional application No. 62/841,132, filed on Apr. 30, 2019.

(51) Int. Cl.
| | |
|---|---|
| G05G 5/00 | (2006.01) |
| E02F 9/24 | (2006.01) |
| F16P 1/00 | (2006.01) |
| G05G 1/32 | (2008.04) |
| G05G 1/60 | (2008.04) |
| F16P 1/02 | (2006.01) |

(52) U.S. Cl.
CPC .............. *G05G 5/005* (2013.01); *E02F 9/24* (2013.01); *F16P 1/00* (2013.01); *F16P 1/02* (2013.01); *G05G 1/32* (2013.01); *G05G 1/60* (2013.01); *G05G 2505/00* (2013.01)

(58) Field of Classification Search
CPC ........... G05G 1/32; G05G 1/60; G05G 5/005; G05G 2505/00; E02F 9/24; F16P 1/00; F16P 1/02
See application file for complete search history.

(56) References Cited

U.S. PATENT DOCUMENTS

| | | | | |
|---|---|---|---|---|
| 2,033,433 A | * | 3/1936 | Leupold | ................ B60W 10/04 477/170 |
| 3,759,115 A | * | 9/1973 | Dibonaventura | ...... H01H 21/26 74/512 |
| 3,916,722 A | * | 11/1975 | Grobe | ...................... G05G 1/44 74/512 |
| D249,505 S | * | 9/1978 | Di Bonaventura | .......... D13/167 |
| 5,807,077 A | * | 9/1998 | Lamanna | .................. F04B 9/14 200/333 |
| 6,182,686 B1 | * | 2/2001 | Jezek | ...................... F16K 31/62 137/377 |
| 2019/0129462 A1 | * | 5/2019 | Kim | ........................ G05G 1/44 |

* cited by examiner

*Primary Examiner* — Prasad V Gokhale

(74) *Attorney, Agent, or Firm* — Schmeiser, Olsen & Watts LLP

(57) ABSTRACT

Disclosed are backhoe pedal guards for covering and protecting the foot pedals of heavy equipment machinery, including backhoes. The backhoe pedal guards are made of steel plate material, or other suitable material. They are configured for installation on or near the floorboard, partially enclosing and protecting the foot pedals, while allowing uninhibited access to the foot pedals by an operator. The backhoe pedal guards act as a safety device to prevent inadvertent engagement of a foot pedal, such as by dropping a tool onto the pedal. In an embodiment, a pair of backhoe pedal guards may be a unitary body connected by a front cross member.

10 Claims, 9 Drawing Sheets

US 10,955,870 B2

BACKHOE PEDAL GUARDS

CROSS REFERENCE TO RELATED APPLICATION[S]

This application claims priority to U.S. Provisional patent application entitled "BACKHOE PEDAL GUARDS," Ser. No. 62/841,132, filed Apr. 30, 2019, the disclosures of which are hereby incorporated entirely herein by reference.

BACKGROUND OF THE INVENTION

Technical Field

This invention relates generally to heavy equipment machinery, and particularly to foot pedal guards for heavy equipment machinery, including backhoes.

State of the Art

Some types of heavy equipment, including certain types of backhoes, have an inherently dangerous condition in the foot pedal control system. In particular, some foot pedals are openly exposed on the floorboard of the equipment. The foot pedals are used to control any of various hydraulic systems, including raising and lowering attachments, such as loader bucket arms, backhoe booms, and the like. Because the foot pedals are openly exposed, it is possible to inadvertently engage the pedals, thereby operating the hydraulic systems to move the attachments. Many deaths, and thousands of injuries have occurred as a result of a laborer placing a tool, such as a saw, a chain, a water jug, or the like, into the cab of such a backhoe, while standing outside of the cab between the backhoe boom and the outrigger, due to the tool falling onto and engaging a pedal.

Accordingly, what is needed is a safety guard to cover the pedals to prevent inadvertent engagement of the pedals, while allowing free access to the pedals by an operator of the equipment.

SUMMARY OF THE INVENTION

The present invention relates to heavy equipment machinery, and particularly to foot pedal guards for heavy equipment machinery, including backhoes.

Embodiments of a pedal guard may comprise a generally U-shaped body having parallel inner and outer plates, the inner plate being disposed vertically between the foot pedal of a backhoe and the center control lever console, and the outer plate being disposed vertically between the foot pedal and the outermost inner surface of the cab. A front cross member plate is coupled between the front edges of the inner and outer plates, such that the inner plate, the front cross member, and the outer plate, enclose the inner and outer sides and the front edge of the right foot pedal of the backhoe, leaving open access to the foot pedal by an operator from the rear. The front cross member may be slanted over the pedal, such that the upper edge thereof is disposed directly above the pedal. The pedal guard is configured for attachment to the frame, the floorboard, the cab, or other suitable portion of the backhoe, or combination thereof, such as by welding, mounting hardware, or the like.

Some embodiments of a pedal guard may comprise a single unitary body configured to protect both the right- and left-side pedals of a backhoe. Such embodiments may comprise a single front cross member that extends across the entire width of the front edge of the floorboard of the backhoe, such that it protects the front edge of both the left and right foot pedals. The front cross member may be L-shaped, having a vertical portion that protects the front of the foot pedals and a horizontal portion that extends over the tops of the foot pedals. The horizontal portion may have an opening through which the center control lever console of the backhoe extends.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in conjunction with the Figures, wherein like reference numbers refer to similar items throughout the Figures, and:

DETAILED DESCRIPTION OF EMBODIMENTS OF THE INVENTION

As discussed above, embodiments of the present invention relate to heavy equipment machinery, and particularly to foot pedal guards for heavy equipment machinery including backhoes.

Figure 1:
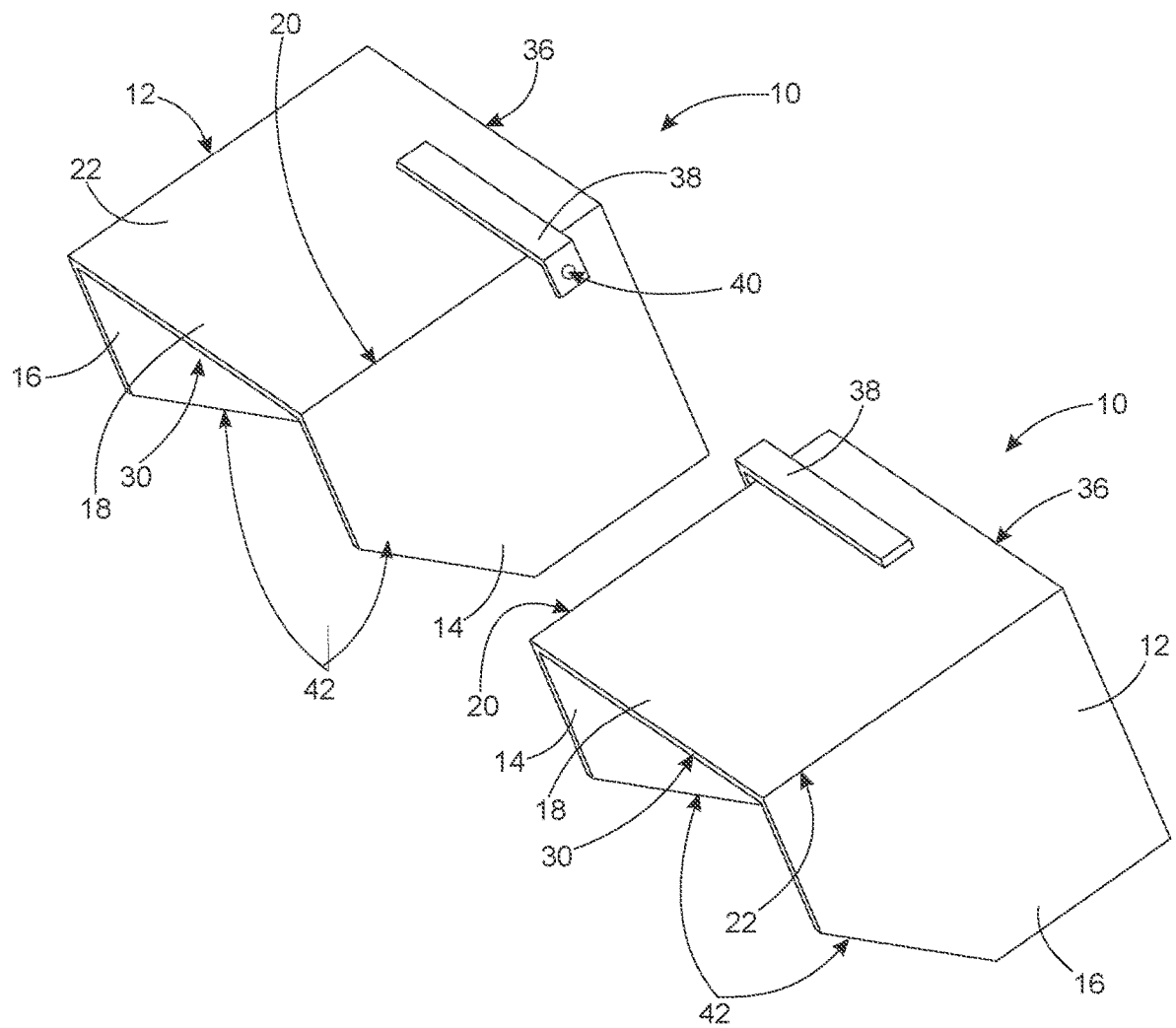
FIG. 1 is a perspective view of a pair of left and right backhoe pedal guards, according to a first embodiment.
Figure 2:
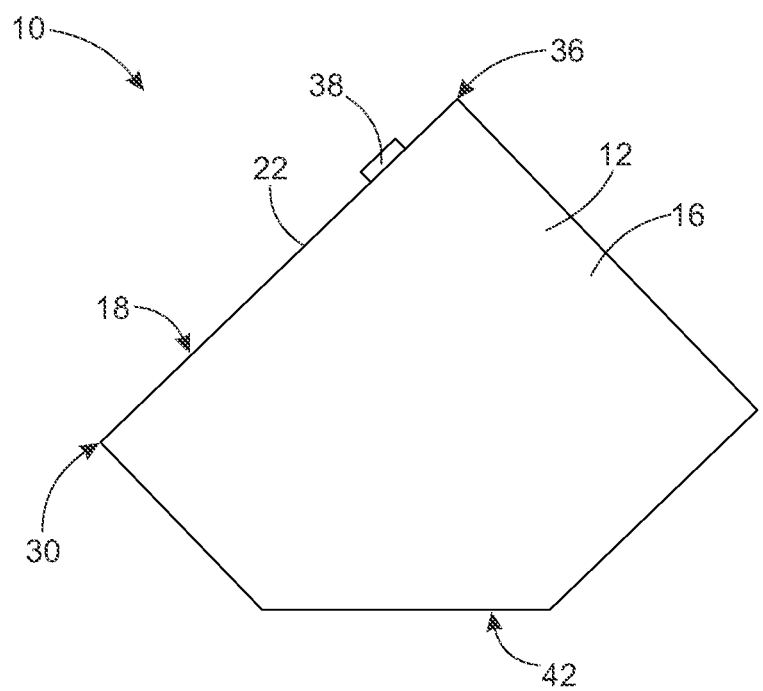
FIG. 2 is a left side view of a right backhoe pedal guard, according to the first embodiment.
Figure 3:
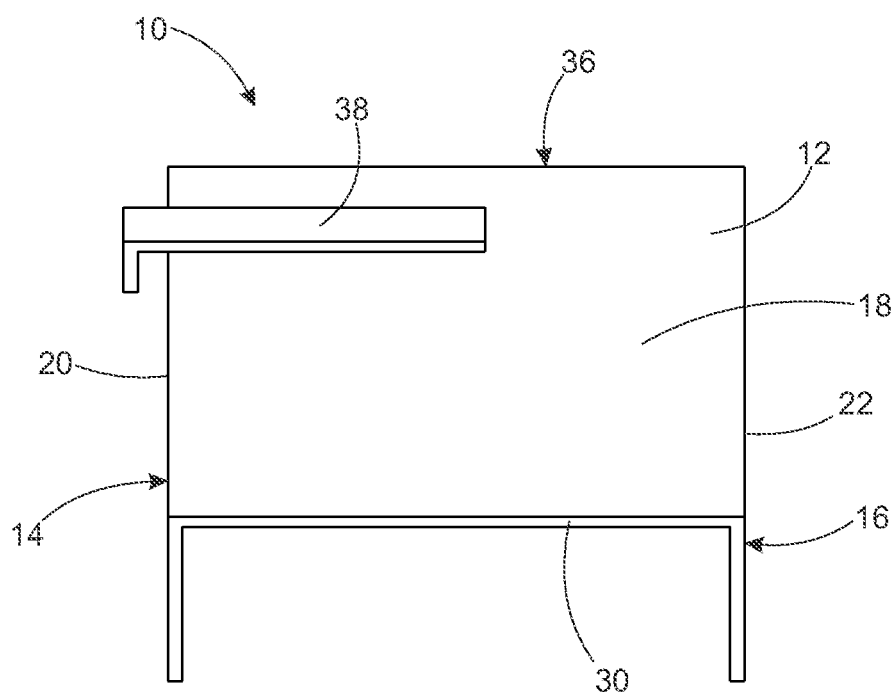
FIG. 3 is a front view of a right backhoe pedal guard, according to the first embodiment.
Figure 4:
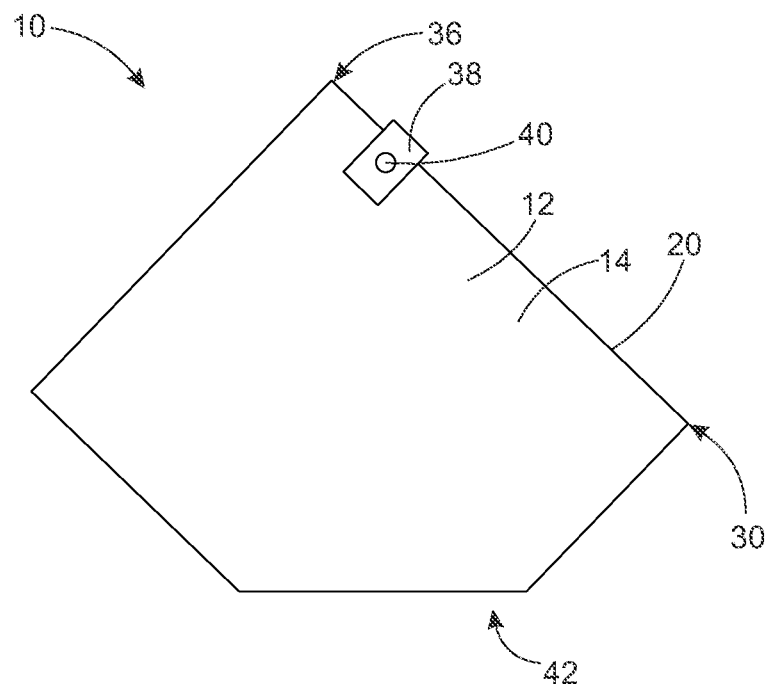
FIG. 4 is a right side view of a right backhoe pedal guard, according to the first embodiment.
Figure 5:
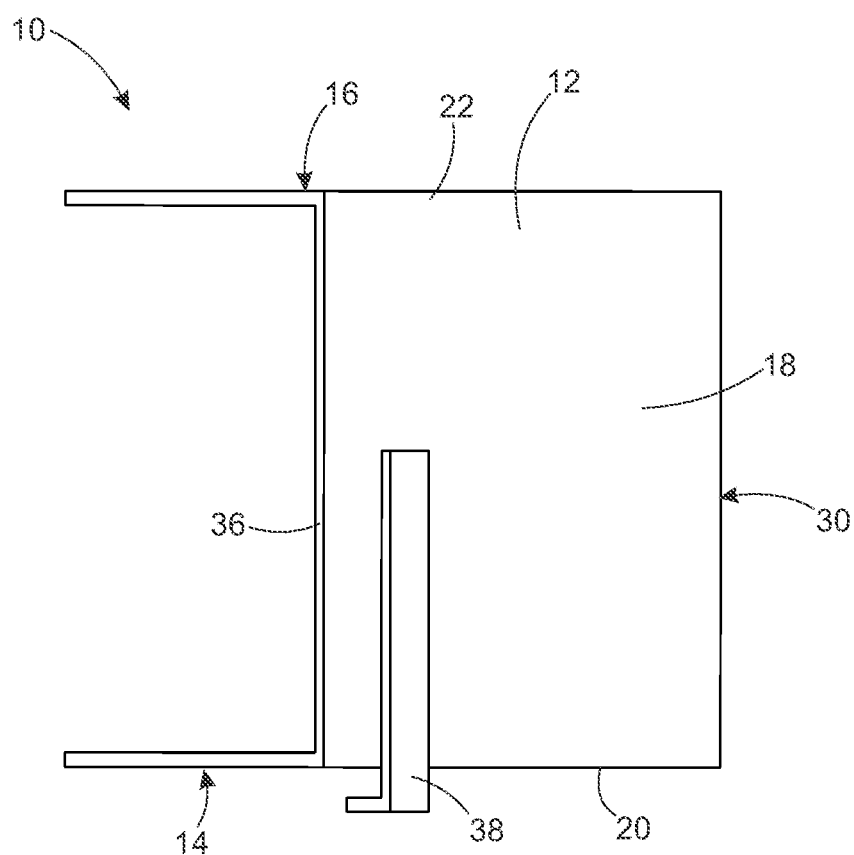
FIG. 5 is a top view of a right backhoe pedal guard, according to the first embodiment.
Figure 6:
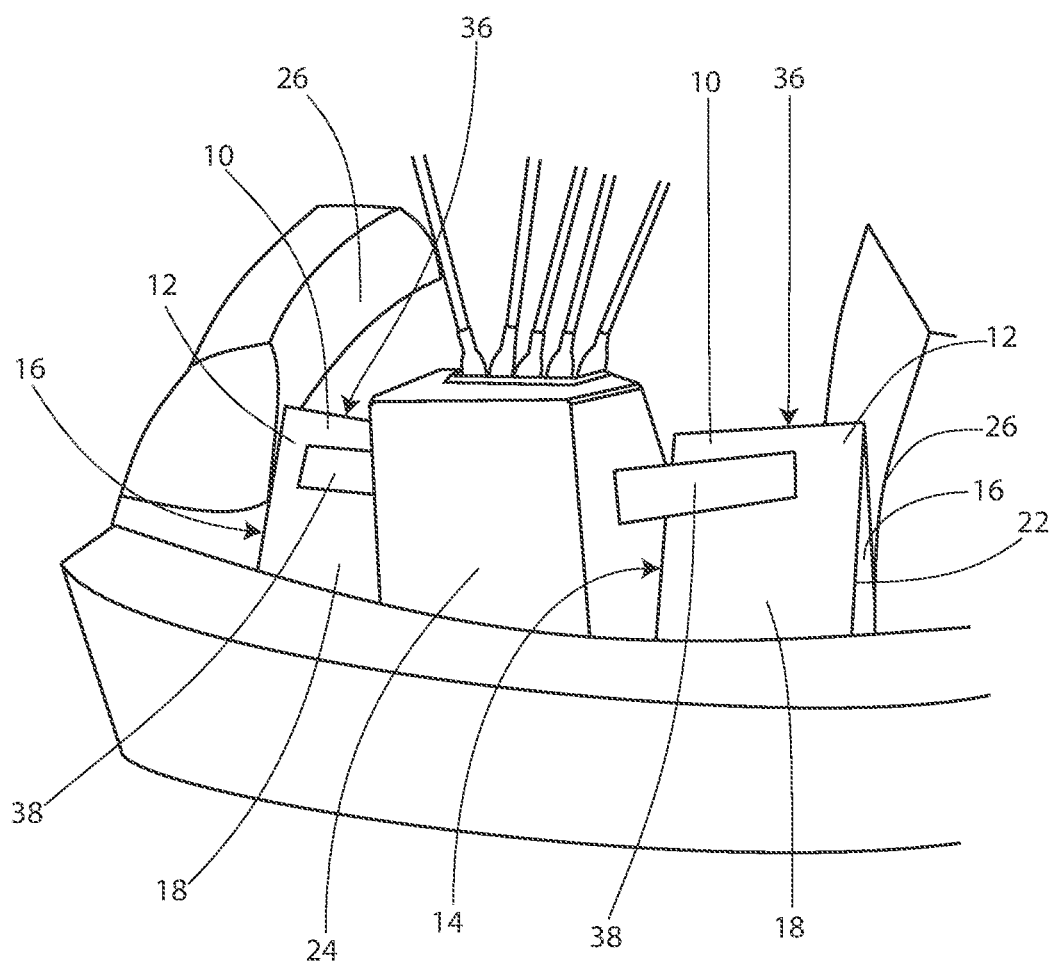
FIG. 6 is a front perspective view of a pair of left and right backhoe pedal guards installed on a backhoe, according to the first embodiment.
Figure 7:
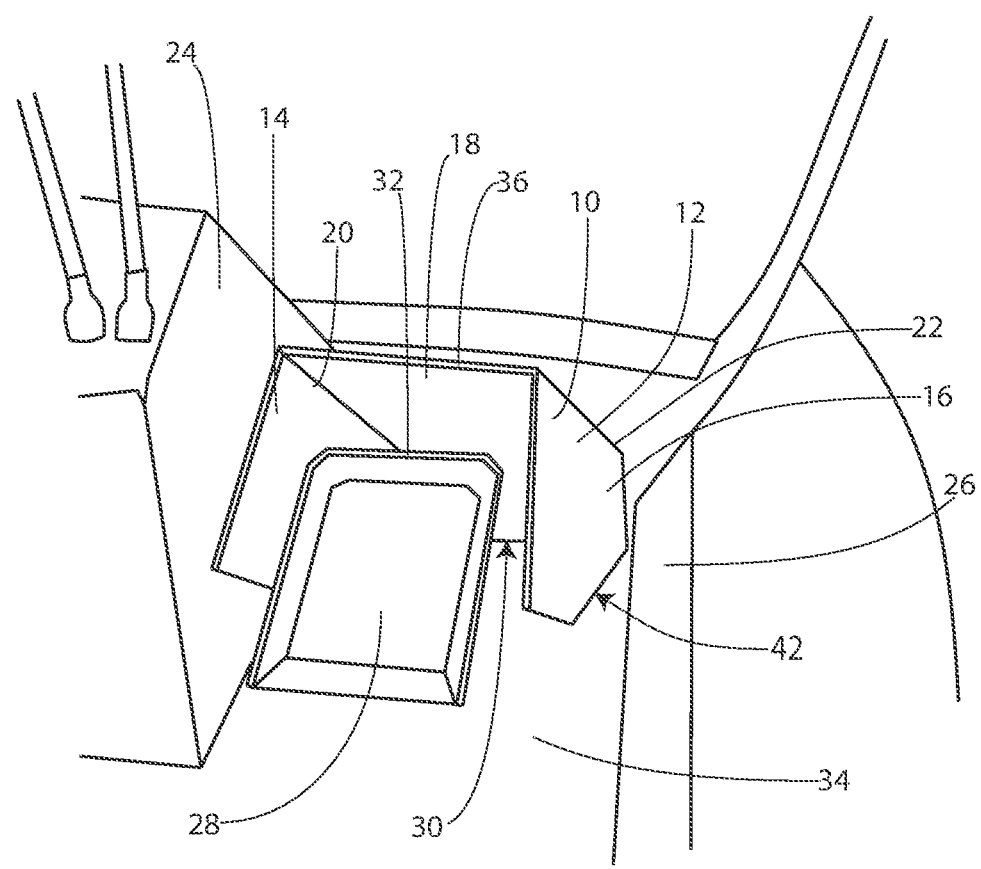
FIG. 7 is a rear perspective view of a right backhoe pedal guard installed on a backhoe, according to the first embodiment.
Figure 8:
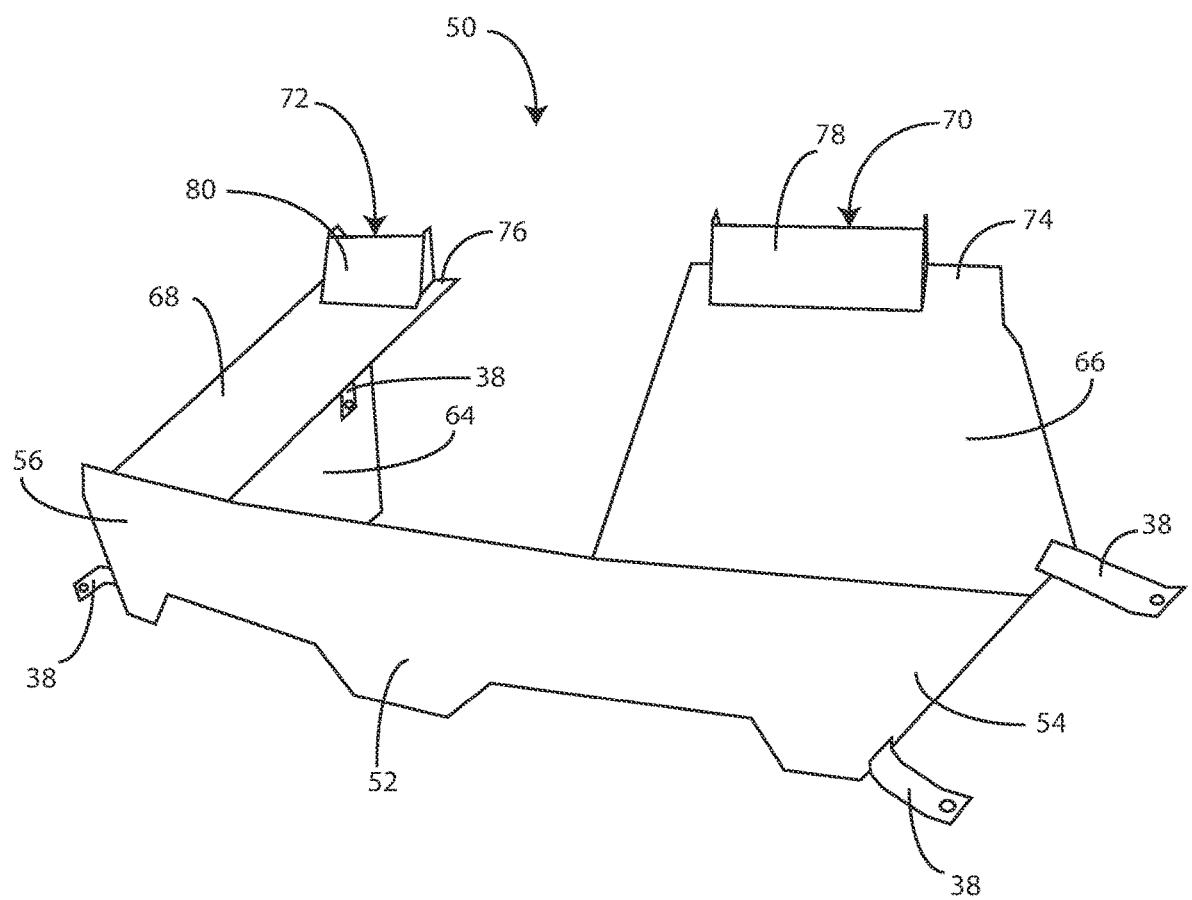
FIG. 8 is a front perspective view of a backhoe pedal guard, according to a second embodiment.

Referring to the drawings, FIGS. 1 and 6 illustrate a pair of right- and left-side pedal guards 10 in accordance with an embodiment. FIGS. 2-5 are left-side, front, right-side, and top views, respectively, of a right-side pedal guard 10, in accordance with the embodiments of FIGS. 1 and 6. As shown, a pedal guard 10 may comprise a generally U-shaped body 12, the body 12 having substantially parallel inner and outer plates, 14 and 16, of steel sheet material, or other suitable material. As shown in FIGS. 6 and 7, while in use, the inner plate 14 may be disposed vertically between the foot pedal 28 and the center control lever console 24 of a backhoe, and the outer plate 16 may be disposed vertically between the foot pedal 28 and the outermost inner surface 26 of the cab of the backhoe. A front cross member 18 of similar steel sheet material, or other suitable material, may be coupled between the front edges 20 and 22 of the inner and outer plates, such that the inner plate 14, the front cross member 18, and the outer plate 16, essentially enclose the foot pedal 28 of the backhoe, leaving open access to the foot pedal 28 by an operator from the rear. The front cross member 18 may be slanted over the pedal 28, wherein the lower edge 30 thereof is disposed in front of and slightly below the front edge 32 of the pedal 28, or in direct contact with the floorboard 34 in front of the pedal 28, and the upper edge 36 thereof is disposed directly above the pedal 28.

In some embodiments, each of the inner and outer plates 14 and 16, as well as the front cross member 18, may be, without limitation, rectangular. In the embodiment shown in FIGS. 1-7, each of the inner and outer plates 14 and 16 has a corner removed to form resting surfaces 42. Resting surfaces 42 are configured to allow pedal guard 10 to rest on the floorboard 34 of a backhoe in such a manner as to allow the front cross member 18 to be slanted over the pedal 28, as described above and as shown in the drawings.

The pedal guard 10 may further comprise at least one of any of a variety of brackets 38 configured for securing the pedal guard 10 to any of the frame, the floorboard 34, the cab, or other suitable portion of the backhoe, or combination thereof, such as by welding, mounting hardware, or the like. For example, as shown in FIGS. 1-6, pedal guard 10 comprises a bracket 38 coupled thereto and configured for securing pedal guard 10 to the center control lever console 24 of a backhoe. Bracket 38, as shown, comprises an aperture 40 therethrough through which a mounting bolt may be inserted for the purpose of securing pedal guard 10 to the center control lever console 24.

It should be understood, that a pair of pedal guards, 10, according to the embodiment shown in FIGS. 1-7, comprise left and right pedal guards 10, wherein a left pedal guard 10 is a similar or identical mirror-image of a right pedal guard 10, the left pedal guard 10 being configured for use over a left-side foot pedal 28 of a backhoe and the right pedal guard 10 being configured for use over a right-side foot pedal 28 of a backhoe.

While in use, the pedal guards, thus disposed, as shown in FIGS. 6 and 7, thereby protect the foot pedals 28 from inadvertent engagement, such as by the dropping of a tool onto a pedal 28, while allowing free access to the pedals 28 by an operator from the rear.

As shown in FIGS. 8-11, an alternative embodiment of a backhoe pedal guard 50, in accordance with the present invention, may comprise a single unitary body configured to protect both the right- and left-side pedals of a backhoe. As shown in these figures, an embodiment may comprise a single front cross member 52, having opposed left and right ends 54 and 56, configured to extend across the entire width of the front edge of the floorboard 34 of the backhoe in a vertical disposition, to protect the front edges of both the left and right foot pedals 58 and 60. A pair of opposed left and right outer plates 62 and 64 are coupled to the left and right ends 54 and 56 of the cross member 52, respectively. When in use on a backhoe, the left and right outer plates 62 and 64 are disposed vertically to protect the outer edges of the left and right foot pedals 58 and 60, respectively. In addition, a pair of left and right top plates 66 and 68 are coupled to the left and right outer plates 62 and 64, respectively, as well as to the cross member 52, proximate the left and right ends 54 and 56 thereof, respectively, such that the left top plate 66 is orthogonal to the left outer plate 62 and orthogonal to the cross member 52 and the right top plate 68 is orthogonal to the right outer plate 64 and orthogonal to the cross member 52. When in use on a backhoe, the left and right top plates 66 and 68 are disposed above the left and right foot pedals 58 and 60, respectively, to protect the pedals from above. In this embodiment, the inner plates 14, of the embodiment shown in FIGS. 1-7, are not necessary, as the center control lever console 24 of the backhoe serves to protect the inner edges of the foot pedals 58 and 60.

Figure 9:
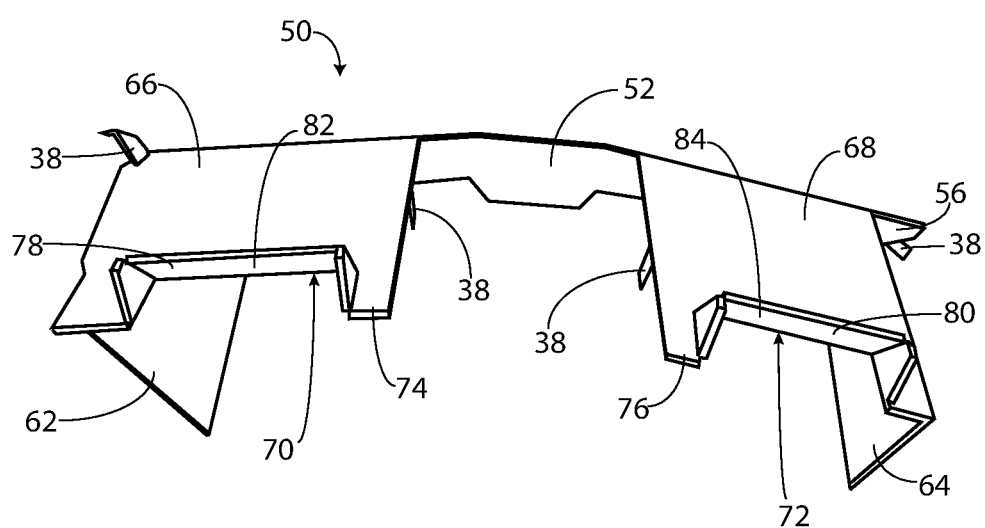
FIG. 9 is a rear perspective view of a backhoe pedal guard, according to the second embodiment.
Figure 10:
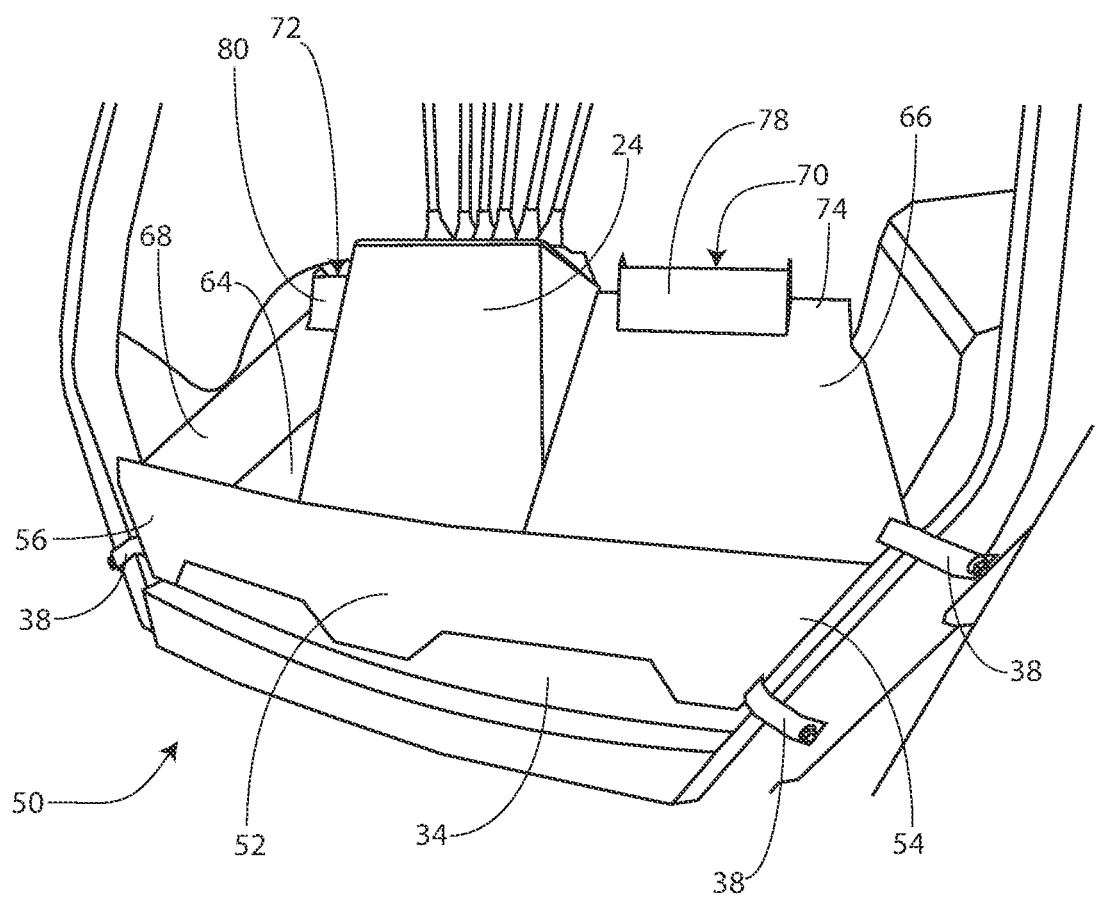
FIG. 10 is a front perspective view of a backhoe pedal guard installed on a backhoe, according to the second embodiment.
Figure 11:
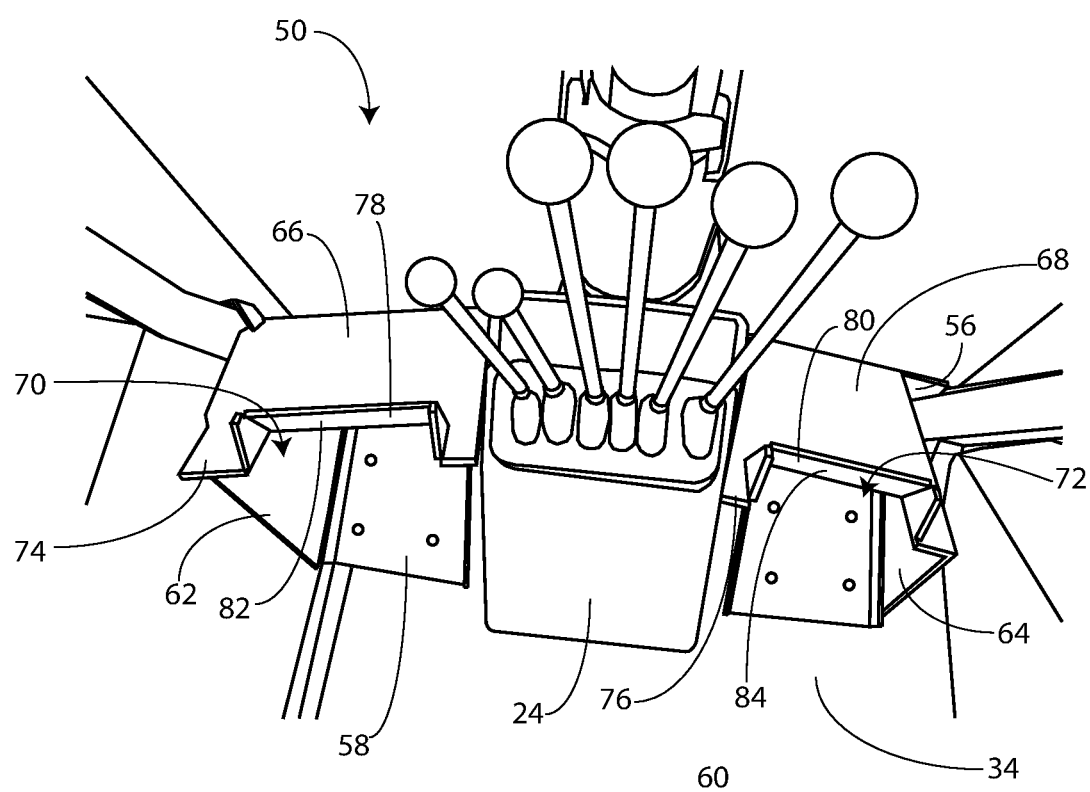
FIG. 11 is a rear perspective view of a backhoe pedal guard installed on a backhoe, according to the second embodiment.

Some embodiments may comprise left and right recesses 70 and 72 in the left and right rear edges 74 and 76 of the left and right top plates 66 and 68, respectively, as shown in FIGS. 9 and 11, for example, to accommodate the lower legs of an operator. Left and right shin guards 78 and 80 may be coupled to each of the left and right top plates 66 and 68 and partially surrounding the left and right recesses 70 and 72 thereof. The shin guards 78 and 80 each provide a substantially vertical surface 82 and 84 which an operator's lower legs may engage to protect the operator's lower legs from injury otherwise due to contact with the rear edges 74 and 76 of the left and right top plates 66 and 68. Embodiments with left and right recesses 70 and 72 are thereby able to cover and protect the tops of the foot pedals 58 and 60, while still allowing uninhibited access to the pedals by an operator.

Embodiments of a backhoe pedal guard 50, as shown in the embodiment of FIGS. 8-11, may further comprise a plurality of brackets 38 coupled thereto for securing the backhoe pedal guard 50 to a backhoe. The configuration and disposition of the plurality of brackets 38, as shown in the drawings, is not intended to be limiting. It is understood that any suitable means of securing a backhoe pedal guard 50 to a backhoe may be used, including any number of bolts, screws, clamping devices, or by welding, or the like, or any combination thereof, and/or any of a variety of brackets or other suitable mounting hardware, or any combination thereof, which may be coupled to the backhoe pedal guard 50 at any of a variety of locations as may be suitable for mounting a backhoe pedal guard 50 to a backhoe.

Although the backhoe pedal guards 10 and 50, as shown in the drawings, and as described herein, are installed or affixed to a backhoe, this is not intended to be limiting. Backhoe pedal guards 10 or 50, of the present invention, may be configured for use on any of a variety of heavy equipment machinery having comparable foot pedals for operating other components of the machinery, hydraulic or otherwise.

The components defining any backhoe pedal guard 10 or 50 may be formed of any of many different types of materials or combinations thereof that can readily be formed into shaped objects provided that the components selected are consistent with the intended operation of backhoe pedal guards 10 or 50. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as copper, zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any backhoe pedal guard 10 or 50 may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, sewing, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A pair of left and right backhoe pedal guards, each of the pair of left and right pedal guards comprising:
    a top plate, further comprising:
        a leading edge;
        a trailing edge parallel to and opposite the leading edge;
        an inner edge adjacent each of the leading edge and the trailing edge; and
        an outer edge parallel to and opposite the inner edge and adjacent each of the leading edge and the trailing edge;
    an inner plate coupled to the top plate and extending perpendicularly from the inner edge;
    an outer plate coupled to the top plate and extending perpendicularly from the outer edge, wherein the outer plate is parallel to the inner plate, wherein each of the pair of left and right pedal guards is configured to rest on a floorboard of a backhoe, wherein the top plate is suspended over a pedal of the backhoe, wherein each of the inner plate and the outer plate comprises a diagonally-cut corner opposite the trailing edge, wherein the respective pedal guard is configured to rest on a floorboard of the backhoe with a lower surface of the diagonally-cut corner resting on the floorboard, wherein the top plate is slanted such that the leading edge is lower than the trailing edge and the trailing edge is suspended above a pedal of the backhoe.

2. The pair of left and right backhoe pedal guards of claim 1, further comprising at least one mounting bracket coupled to each of the pair of left and right backhoe pedal guards, wherein the at least one mounting bracket is configured for coupling the respective backhoe pedal guard to the backhoe.

3. A backhoe pedal guard, comprising:
    a front cross member, comprising:
        a left end; and
        a right end opposite the left end;
    a left outer plate coupled to the left end and extending perpendicularly therefrom;
    a right outer plate coupled to the right end and extending perpendicularly therefrom, wherein the left outer plate is substantially parallel to the right outer plate;
    a left top plate coupled to and extending orthogonally from both the front cross member and the left outer plate; and
    a right top plate coupled to and extending orthogonally from both the front cross member and the right outer plate, wherein the backhoe pedal guard is configured to rest on a floorboard of a backhoe wherein the front cross member is disposed in front of a console of the backhoe, the console extending upward between the left and right top plates, and each of the left and right top plates being suspended over a left and right pedal, respectively, of the backhoe.

4. The backhoe pedal guard of claim 3, further comprising at least one mounting bracket coupled thereto, wherein the at least one mounting bracket is configured for coupling the backhoe pedal guard to the backhoe.

5. The backhoe pedal guard of claim 4, wherein each of the left and right top plates further comprises a recess in a trailing edge thereof, wherein the recess is configured to accommodate a shin of a user extending through the recess when the backhoe pedal guard is coupled to the backhoe.

6. The backhoe pedal guard of claim 5, wherein each of the left and right top plates further comprises a shin guard coupled to the respective trailing edge thereof adjacent the respective recess thereof and disposed perpendicular to the respective top plate.

7. A backhoe pedal guard, comprising:
    an elongate front cross member, comprising:
        a left end; and
        a right end opposite the left end;
    a left outer plate coupled to and extending rearward from the left end;
    a right outer plate coupled to and extending rearward from the right end;
    a left top plate coupled to and extending inward from a top portion of the left outer plate and coupled to and extending rearward from a top portion of the front cross member proximate the left end; and
    a right top plate coupled to and extending inward from a top portion of the right outer plate and coupled to and extending rearward from a top portion of the front cross member proximate the right end, wherein the backhoe pedal guard is configured to rest on a floorboard of a backhoe wherein the front cross member is disposed in front of a console of the backhoe, the console extending upward between the left and right top plates, and each of the left and right top plates being suspended over a left and right pedal, respectively, of the backhoe, wherein the rearward direction is toward a seat of the backhoe from the console and the forward direction is toward the console from the seat.

8. The backhoe pedal guard of claim 7, further comprising at least one mounting bracket coupled thereto, wherein the at least one mounting bracket is configured for coupling the backhoe pedal guard to the backhoe.

9. The backhoe pedal guard of claim 8, wherein each of the left and right top plates further comprises a recess in a trailing edge thereof, wherein the recess is configured to accommodate a shin of a user extending through the recess when the backhoe pedal guard is coupled to the backhoe.

10. The backhoe pedal guard of claim 9, wherein each of the left and right top plates further comprises a shin guard coupled to the respective trailing edge thereof adjacent the respective recess thereof and extending upward from the respective top plate when the backhoe pedal guard is coupled to the backhoe.

* * * * *